June 6, 1933.  D. I. GRAHAM  1,912,704
PERCH HOLDER
Filed Jan. 15, 1931

Inventor:
Daniel I. Graham
By F. DeWitt Goodwin
Attorney

Patented June 6, 1933

1,912,704

UNITED STATES PATENT OFFICE

DANIEL I. GRAHAM, OF PHILADELPHIA, PENNSYLVANIA

PERCH HOLDER

Application filed January 15, 1931. Serial No. 508,957.

My invention relates to improvements in a perch holder for bird cages.

The object of my invention is to provide a holder by which a perch may be quickly attached or removed from a bird cage; a further object is to provide a perch holder which may be readily secured in any position upon the vertical bars of a bird cage; a further object is to provide a perch holder constructed so that it may be entirely positioned outside of the bird cage and arranged for supporting a perch extending into the cage from the perch holder; and a still further object is to provide a perch holder which may be formed either of sheet metal, or of wire, and manufactured at a very low cost of production.

These together with various other novel features of construction and arrangement of the parts, which will be more fully hereinafter described and claimed, constitute my invention.

Figure 1:
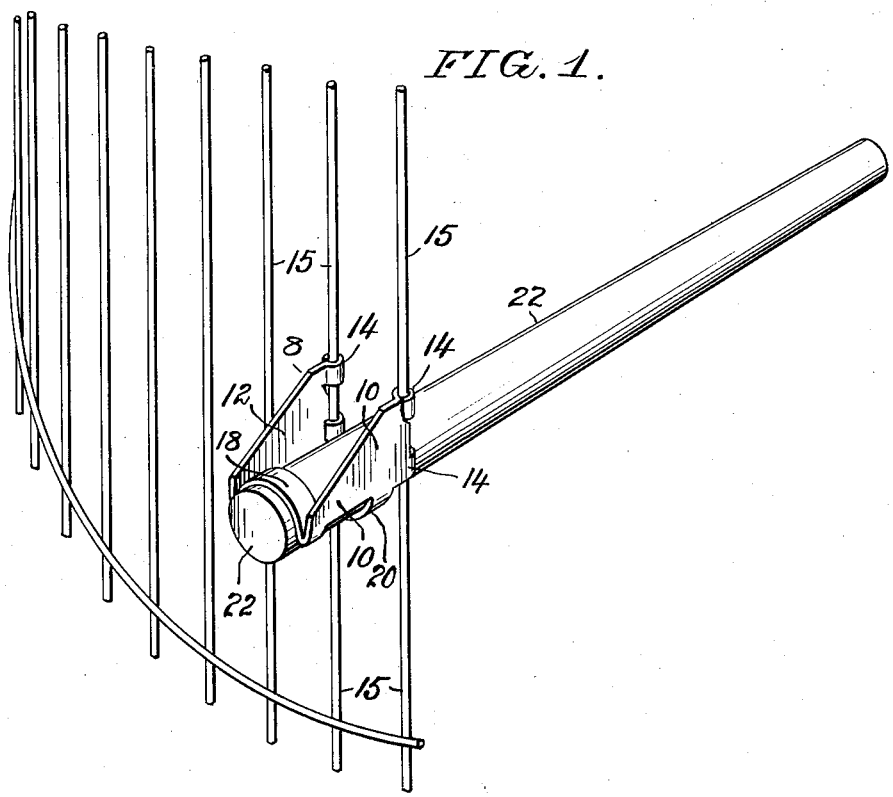
Figure 2:
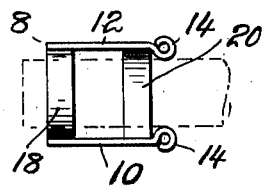
Figure 6:
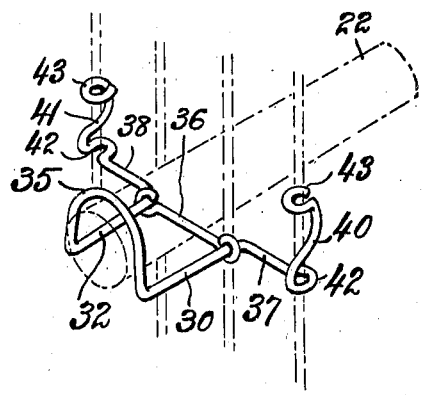
Figures 3, 4, 5:
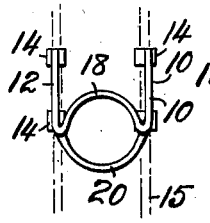

Referring to the accompanying drawing Fig. 1 is a perspective view of my improved perch holder showing a portion of a bird cage with the holder attached and the perch extending into the cage; Fig. 2 is a plan view of the perch holder shown in Fig. 1; Fig. 3 is a side elevation of the perch holder; Fig. 4 is an end view of Fig. 3; Fig. 5 is a view showing the opposite end of Fig. 3; and Fig. 6 is another form of my improved perch holder.

In the accompanying drawing in which like reference characters refer to like parts, 8 represents the perch holder consisting of side members 10 and 12, formed of sheet metal, having fastening devices in the form of tongues 14 formed upon the ends of the side members arranged to be clamped around the vertical bars 15 of a bird cage. Cross bars 18 and 20 connect the side members 10 and 12 and are adapted for holding the latter in spaced relation to each other and arranged for the free insertion and removal of the perch 22, by passing the perch between the side members.

The cross bars 18 and 20 are located in different vertical planes relatively to the length of the side members 10 and 12. The cross bar 20 is located upon the side members adjacent to the end thereof carrying the fastening means, or tongues 14, and is arranged to extend under the perch for supporting the latter. The other cross bar 18 is located at the outer extremity of the side members 10 and 12, relatively to the ends carrying the fastening means, and said bar 18 is curved upwardly and arranged to extend over the upper surface of the perch 22 for holding the latter in a horizontal position.

The perch holder above described may be stamped from a single sheet of metal and formed into shape by a very simple operation, making the cost of production extremely low. The holder may be readily attached to a bird cage by bending the tongues 14 around the bars 15 of the cage for supporting the holder in any vertical position upon the bars of the cage.

My improved perch holder may be constructed of wire, as shown in Fig. 6. The side members 30 and 32 are formed with cross bars 35 and 36 for supporting the perch in a horizontal position. The cross bar 36 may be formed of a separate piece of wire with the ends rigidly attached to the horizontal side members 30 and 32. The side members 30 and 32 are provided with horizontal extensions 37 and 38, which are bent at right angles to the side members 30 and 32 and are of sufficient length to embrace four of the vertical bars of a cage. At the extreme ends of the extensions 37 and 38 are formed upwardly projecting end members 40 and 41, which are provided with loops 42 and 43 arranged to embrace the vertical bars of the cage and adapted to be clamped around said bars for securing the holder in a fixed position upon the cage.

The forms of my improved perch holder above described may be readily secured upon a bird cage by simply clamping the fastening devices around the vertical bars of a cage. The side members are positioned upon the outside of the cage bars and are so arranged relatively to the fastening devices that the space between the side members will align with the space between the cage bars.

The perch which is preferably of cylindrical form may be secured in position by passing one end upwardly between the side members and between the cross bars, allowing the perch to rest upon the lower cross bar and the extreme outer end of the perch to be engaged below the outer cross bar of the holder, thus it will be seen that the perch will be held in a horizontal position, from which it may be readily removed by simply pressing the outer end of the perch downwardly and withdrawing it from the holder.

I claim:—

1. A perch holder for bird cages comprising horizontal side members, cross bars located at opposite ends of said members and connected with the latter for positioning said members in spaced parallel relation to each other to freely receive a perch between them, said cross bars being located in different positions with one of said bars arranged to extend under the perch and the other one arranged to extend over the perch for holding the latter in a horizontal position, and fastening means located upon each side member adjacent to the lower one of said cross bars arranged for rigidly securing the side members to the vertical bars of a cage with said cross bars positioned outside of the cage and detachably supporting one end of the perch in a position to be accessible from without the cage.

2. A perch holder for bird cages comprising horizontal side members, cross bars located at opposite ends of said members and connected with the latter for positioning said members in spaced parallel relation to each other to freely receive a perch between them, said cross bars being located in different positions with one of said bars arranged to extend under the perch and the other one arranged to extend over the perch for holding the latter in a horizontal position, an extension member upon each side member located adjacent to the lower one of said cross bars, said extension members being positiond horizontally and at right angles to said side members, and fastening means upon the outer ends of said extension members arranged for rigidly securing said side members to the vertical bars of a cage with said cross bars positioned outside of the cage.

In testimony whereof I affix my signature.

DANIEL I. GRAHAM.